May 8, 1956 D. K. GANNETT 2,745,068

TRANSISTOR NEGATIVE IMPEDANCE CONVERTERS

Filed Dec. 23, 1954 4 Sheets-Sheet 1

INVENTOR
D. K. GANNETT

BY R. B. Ardis

ATTORNEY

TRANSISTOR NEGATIVE IMPEDANCE CONVERTERS

Filed Dec. 23, 1954 4 Sheets-Sheet 2

INVENTOR
D. K. GANNETT
BY R. B. Andis
ATTORNEY

May 8, 1956 D. K. GANNETT 2,745,068

TRANSISTOR NEGATIVE IMPEDANCE CONVERTERS

Filed Dec. 23, 1954 4 Sheets-Sheet 3

INVENTOR
D. K. GANNETT

BY R. B. Ardis

ATTORNEY

May 8, 1956 D. K. GANNETT 2,745,068

TRANSISTOR NEGATIVE IMPEDANCE CONVERTERS

Filed Dec. 23, 1954 4 Sheets-Sheet 4

INVENTOR
D. K. GANNETT
BY R. B. Ardis
ATTORNEY

United States Patent Office 2,745,068

Patented May 8, 1956

2,745,068

TRANSISTOR NEGATIVE IMPEDANCE CONVERTERS

Danforth K. Gannett, Mountain Lakes, N. J., assignor to Bell Telephone Laboratories, Incorporated, New York, N. Y., a corporation of New York Application December 23, 1954, Serial No. 477,298

14 Claims. (Cl. 333—80)

This invention relates generally to transistor negative impedance converters and more particularly to transistor four-terminal negative impedance converters which, over a prescribed frequency range, present at each pair of terminals an impedance which is substantially the negative of any passive impedance connected to the other pair of terminals.

A principal object of the invention is to improve the accuracy of transistor negative impedance converters.

Another and more particular object is to insure that the conversion factor of a transistor negative impedance converter is substantially a numeric over the frequency range of interest.

As outlined by George Crisson in his article on "Negative impedances and the twin 21-type repeater," appearing at page 485 of the July 1931 issue of the Bell System Technical Journal, negative impedances may be classified in two categories. The first of these includes negative impedances of the series or reversed voltage type. Such negative impedances are open-circuit stable and can be connected in series in a transmission line, for example, to produce amplification without breaking into self-oscillation. The second group includes negative impedances of the shunt or reversed current type. Such negative impedances are short-circuit stable and can be connected in shunt across a transmission line to provide amplification without singing. One or more negative impedances of each type may be associated with each other to reduce the loss of a transmission line below the level which would be made possible through the use of negative impedances of one type alone.

One of the best vacuum tube circuits for producing negative impedances of both the series type and the shunt type is disclosed by J. L. Merrill, Jr., in his article "Theory of the negative impedance converter," appearing at page 88 of the January 1951 issue of the Bell System Technical Journal. Fig. 6 of the article illustrates a four-terminal negative impedance converter which, when an impedance N is connected across one pair of terminals, presents an impedance of substantially $-a$N at its other pair of terminals and, when an impedance N is connected across the other pair of terminals, presents an impedance of substantially $$\frac{N}{-a}$$

at the first pair of terminals. In these impedance expressions, $-a$N is a negative impedance of the series type, $$\frac{N}{-a}$$

is a negative impedance of the shunt type, and $a$ is substantially a numeric (i. e., a real number) over the prescribed operating frequency range.

Two principal requirements in a negative impedance converter of the type described in the above-identified Merrill article, however, are that the transducer used in the converter transmit in one direction only (i. e., have substantially infinite loss in the opposite direction) and that the transducer absorb substantially no energy in its input circuit. If these requirements are not met, the factor $a$ ceases to be a numeric but becomes a function of the connected impedance N. This effect, if at all substantial, seriously detracts from the utility of the converter, particularly with respect to the ease of design of terminating networks providing the positive impedances which are to be converted to negative impedances.

For a negative impedance converter to be of general applicability, it is important that over the frequency range of interest the conversion factor be substantially a numeric which is independent of the impedances of the terminating networks. When it has such a conversion factor, the effect of the converter on the phase of the impedance presented by the terminating network is merely to add (or subtract, depending on the point of view) 180 degrees. The impedance presented at the converter terminals then is, with respect to phase, substantially the exact negative of the positive impedance of the terminating network, and the design of the terminating network required for any given installation is relatively simple. Negative resistive components in the desired negative impedance are provided by positive resistance components in the converter terminating network, while positive or negative reactive components of the desired negative impedance are provided by negative or positive reactive components, respectively, in the terminating network which bear the same phase relationship to the positive resistance components that the desired reactive components have to the desired negative resistance components. When the conversion factor is not a real number, however, and has a substantial imaginary component, the effect of the converter on the phase of the needed terminating network impedance is more complicated; and the design of the terminating networks needed in each individual instance becomes a major problem.

The vacuum tube negative impedance converter described in the Merrill article provides a conversion ratio which is substantially a numeric over the audio frequency range since at those frequencies the vacuum tube is inherently a one-way device and, in addition, has substantially an infinite input impedance. The vacuum tube can readily be connected to absorb substantially no energy in its input circuit, and the conversion factor of the negative impedance converter using it is the required real number having no substantial imaginary component or phase angle. Most transistors, however, are not inherently one-way devices with either infinite or zero input impedances. In the audio band, they transmit to some degree in both directions and have input impedances which are somewhere in the very broad intermediate region bounded by substantially zero and substantially infinity. If a transistor negative impedance converter is to be as versatile and useful a device as the vacuum tube negative impedance converter described in the Merrill article, some means should be provided to overcome the disadvantages imposed by these inherent transistor properties.

From one important aspect, the present invention is a transistor negative impedance converter in which the inherent reverse transmission through the transistor is substantially neutralized and the transistor input impedance is reduced to substantially zero. Having an input impedance of substantially zero, the transistor is connected so that substantially no energy is absorbed in its input circuit. Both of the principal requirements for a conversion factor which is substantially a real number thereby are met, and the converter is capable of the same breadth of application as the vacuum tube negative impedance converter described in the Merrill article. In a sense, therefore, the present invention brings to the negative impedance converter field the well known transistor advantages of small size, low power requirements, and instantaneous availability for service without entailing any sacrifice in performance due to any of the fundametal differences between the operating characteristics of vacuum tubes and transistors.

In general, the invention takes the form of a negative impedance converter having a standard three-electrode transistor, one pair of electrodes of which form a pair of input electrodes and another pair of the electrodes form a pair of output electrodes, a transformer having a first winding connected between the transistor output electrodes and a second winding coupled in series with a predetermined passive impedance between a third pair of the three transistor electrodes. The turns ratio between the first and second transformer windings is determined by the internal four-pole equivalent impedances of the transistor, and the size of the predetermined impedance is determined both by the internal four-pole equivalent impedances of the transistor and by the transistor current amplification factor. Transformer coupling in the path between the third pair of electrodes is used if the transistor current amplification factor is less than unity. A first pair of external terminals are connected to the transistor output electrodes, and a second pair are connected to opposite ends of the predetermined impedance in the path between the third pair of transistor electrodes. In this form, the operation of the embodiments of the invention is substantially the same as that of the vacuum tube negative impedance converter disclosed by Merrill. When an impedance N is connected across one pair of terminals, an impedance of substantially $-a$N is presented at the other pair, and when an impedance N is connected across the other pair of terminals, an impedance of substantially $$\frac{N}{-a}$$

is presented at the first pair. As before, $-a$N is a negative impedance of the series type, $$\frac{N}{-a}$$

is a negative impedance of the shunt type, and $a$ is substantially a numeric over the prescribed operating frequency range.

A more complete understanding of the invention may be obtained from a study of the following detailed exposition thereof and description of several specific embodiments. In the drawings.

Figure 7:
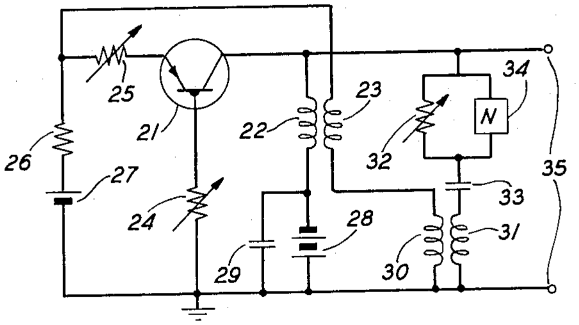
Figure 8:
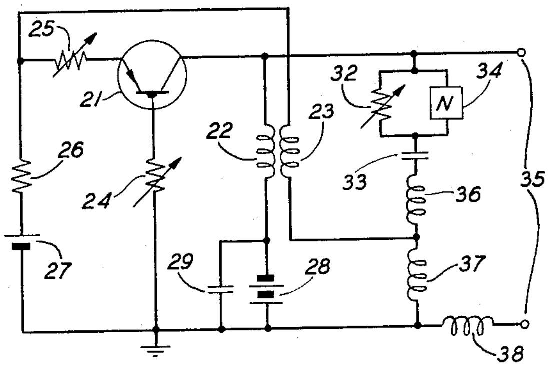
Figure 9:
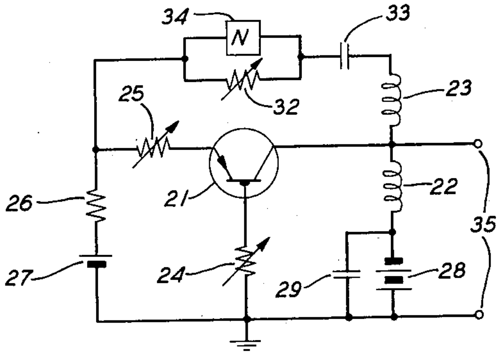
Figure 10:
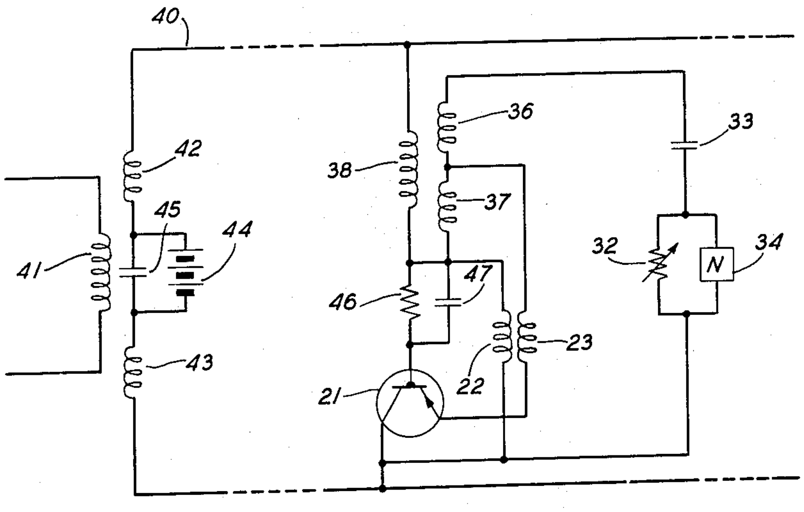
Figure 11:
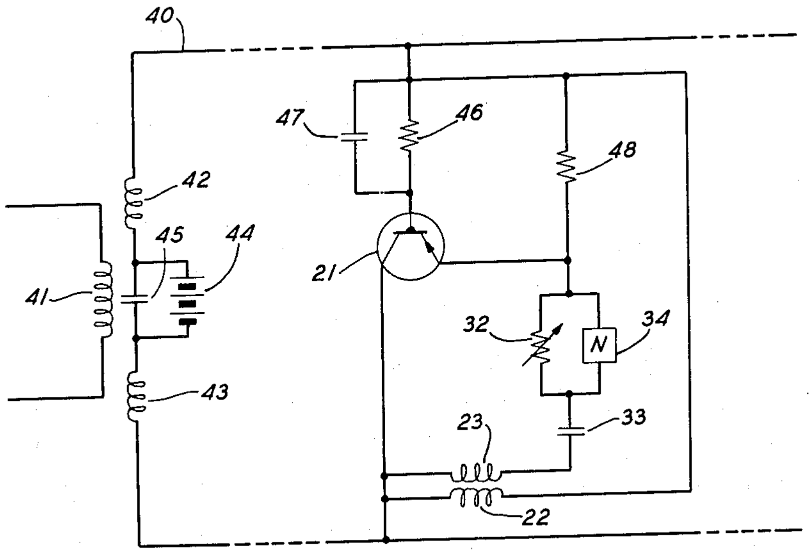

Figs. 7, 8, and 9 illustrate specific common-base transistor negative impedance converters embodying the present invention; and Figs. 10 and 11 show common-base transistor negative impedance converters embodying the invention providing negative impedances of the so-called shunt or reversed current type connected in shunt across transmission lines to reduce the loss thereof.

As stated above, the principle employed in the negative impedance converter disclosed in the Merrill article requires a transducer which ($a$) transmits in one direction only, having substantially infinite loss in the opposite direction, and ($b$) absorbs substantially no energy in its input circuit. Both of these requirements must be met if the converter circuit is to produce an impedance which is rigorously equal to the negative of a given terminating network impedance. In the vacuum tube circuit disclosed by Merrill, requirement ($a$) is met because of the inherent one-way transmission characteristics of the tube in the audio frequency range (where parasitic capacitances do not provide any appreciable reverse coupling), and requirement ($b$) is met because of the substantially infinite input impedance of the tube. Requirement ($b$) could, however, also be met by a current-amplifying device having substantially zero input impedances.

Figure 1:
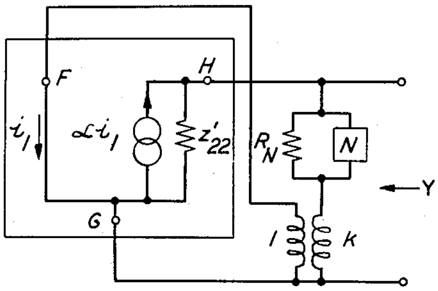
Fig. 1 is an equivalent circuit of a transistor negative impedance converter in which the transistor is assumed to transmit only in one direction and to have substantially zero input impedance.

Fig. 1 illustrates a negative impedance converter using a transducer having zero instead of infinite input impedance. The transducer is shown as a box having its terminals labeled F, G, and H, where F and G form a pair of input terminals and H and G form a pair of output terminals, and having a current amplification factor $\alpha$ (the ratio of output current into a short-circuit to the input current $i_1$). The current amplification factor $\alpha$ is substantially equal to $z'_{21}/z'_{22}$, where $z'_{21}$ is the transfer impedance from the transducer input terminals to the transducer output terminals, and $z'_{22}$ is the self impedance between the transducer output terminals. The associated circuit includes a network of impedance N in parallel with a resistance $R_N$, and a current transformer of turns ratio $k$ for providing positive feedback by applying $k$ times the current through these impedances to the transducer input terminal F.

In Fig. 1, it can readily be shown that the admittance looking into the right-hand end of the circuit is $$Y=\frac{1}{z'_{22}}-\left(\frac{1}{N}+\frac{1}{R_N}\right)(k\alpha-1) \qquad (1)$$

If $R_N$ is given the value $$R_N=z'_{22}(k\alpha-1) \qquad (2)$$

the admittance of the circuit becomes $$Y=-\frac{1}{N}(k\alpha-1) \qquad (3)$$

which is proportional to the negative of the admittance of the network N. The impedance presented by the circuit is therefore $$Z=\frac{N}{-(k\alpha-1)} \qquad (4)$$

In Crisson's terminology this is a negative impedance of the shunt or reversed current type and is short-circuit stable (i. e., stable only if the impedance of the external circuit to which the negative impedance is connected is less than the negative impedance presented by the converter).

It can also be shown with respect to the circuit of Fig. 1 that if the passive terminating network N is interchanged with the pair of external terminals shown at the right-hand side of the figure (i. e., if the network N is connected to transducer terminals H and G and the external terminals are connected to opposite ends of the resistance $R_N$), the impedance presented at the external terminals would be $$Z=-N(k\alpha-1) \qquad (5)$$

which is also proportional to the negative impedance of the network N. In Crisson's language, this is a negative impedance of the series or reversed voltage type and is open-circuit stable (i. e., stable only if the impedance of the external circuit to which the negative impedance is connected is greater than the negative impedance presented by the converter).

Figure 1A:
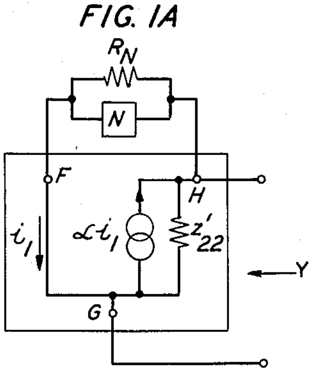
Fig. 1A is a variation of Fig. 1 in which the transistor has a current amplification factor greater than unity.

As is apparent from Equations 4 and 5, a principal requirement for the attainment of a negative impedance conversion ratio with the circuit of Fig. 1 is that the product $k\alpha$ be greater than unity. If $\alpha$ itself is less than unit, then $k$ should be sufficiently large to bring the product above unity. If $\alpha$ is greater than unity, then the positive feedback transformer of Fig. 1 can be omitted and the circuit arrangement can be as shown in Fig. 1A, where the admittance looking in at the right-hand end of the circuit is $$Y=\frac{1}{z'_{22}}-\left(\frac{1}{N}+\frac{1}{R_N}\right)(\alpha-1) \qquad (6)$$

$R_N$ is given the value of $$R_N=z'_{22}(\alpha-1) \qquad (7)$$

and the admittance of the circuit becomes $$Y=\frac{1}{N}(\alpha-1) \qquad (8)$$

The impedance presented at the terminals shown is therefore $$Z=\frac{N}{-(\alpha-1)} \qquad (9)$$

and if the external terminals are interchanged with the terminating network N, the impedance presented thereat is $$Z=-N(\alpha-1 \qquad (10)$$

The preceding analysis proceeds, however, upon the assumption that the transducer transmits in only one direction and has an input impedance of substantially zero. Only if these conditions are satisfied will the negative impedance conversion ratios defined by Equations 4, 5, 9, and 10 be numerics. Otherwise they will be a function of N and may have substantial phase angles which tend to interfere seriously with many practical applications of the converters. As has already been pointed out, transistors do not ordinarily satisfy these requirements in the frequency range. While they may approach the required characteristics sufficiently to permit their use in some instances, the departure is sufficient to militate against their use in negative impedance converters in which the requirements for negative impedance conversion accuracy are at all severe.

One important aspect of the invention overcomes this inherent disadvantage of transistor negative impedance converters and permits them to achieve a negative impedance conversion accuracy which is fully as great as that provided by vacuum tube negative impedance converters. In accordance with a principal feature of the invention, a transformer having a specifically selected turns ratio (dependent upon the internal impedances of the transistor) is connected with one winding across the transistor output terminals and the other winding in series with one of the transistor input terminals to neutralize the transmission through the transistor in the reverse direction. This feature of the invention can be applied to common base, common emitter, and common collector transistor circuit configurations and can be arranged in each instance to give an infinite loss in either direction of transmission. When this is done, the gain in the operative direction is determined by a transfer impedance that has the same absolute magnitude in every case and is equal to the mutual resistance $r_m$ of the familiar equivalent T network of a bare transistor. At the same time, the effect on the input impedance of the transistor is to make it substantially equal to the short-circuit input impedance of the bare transistor. The latter impedance is either substantially zero or can be made substantially zero by the addition of a small series resistance to one of the transistor terminals.

In general, if the short-circuit transistor input impedance is positive, it can be reduced to zero by adding resistance in series with base. If it is negative, on the other hand, resistance added in series with the emitter will reduce it to zero. The amount added in each instance is dependent upon transistor constants.

Figure 2:
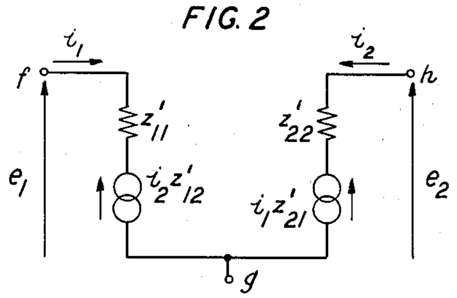
Fig. 2 is a standard transistor equivalent circuit.

Fig. 2 represents a generalized equivalent network for a three-terminal device such as a transistor. The three terminals are labeled $f$, $g$ and $h$, terminal $g$ being common to both input and output circuits. The network is characterized by four impedances:

$z'_{11}$=the impedance between $f$ and $g$, $h$–$g$ being open
$z'_{22}$=the impedance between $h$ and $g$, $f$–$g$ being open
$z'_{21}$=transfer impedance from $f$ to $h$ when $h$–$g$ is open
$z'_{12}$=transfer impedance from $h$ to $f$ when $f$–$g$ is open Transfer impedance $z_{yx}$ is defined as the quantity by which the current in branch $x$ must be multiplied to obtain the open circuit voltage across branch $y$. When $z_{yx}=z_{xy}$ the transfer impedance is the same as the mutual impedance.

Figure 3:
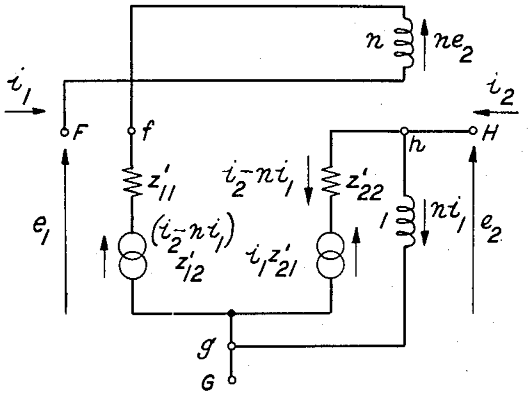
Figs. 3 and 3A are equivalent circuits of transistors in which reverse transmission is neutralized in accordance with one feature of the invention and the input impedance is reduced to a very low value.

Fig. 3 shows a transformer having a turns ratio of $1:n$ added to the network of Fig. 2, with one winding connected between terminals $h$ and $g$ and the other winding connected in series with terminal $f$. This arrangement is, in turn, equivalent to another network similar to Fig. 2 as shown in Fig. 3A, the constants of which are expressed by capital letters.

Figure 3A:
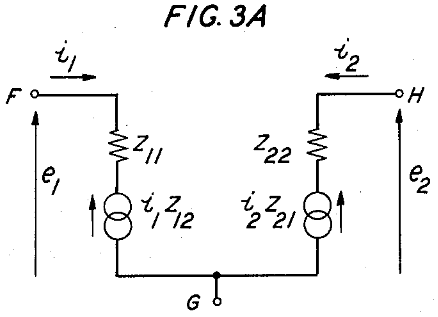

In Figs. 3 and 3A $$\begin{aligned} e_2&=i_1z'_{21}+(i_2-ni_1)z'_{22} \\ &=i_1(z'_{21}-nz'_{22})+i_2z'_{22} \end{aligned} \qquad (11)$$

and $$\begin{aligned} e_1&=i_1z'_{11}+(i_2-ni_1)z'_{12}-ne_2 \\ &=i_1[z'_{11}+n^2z'_{22}-n(z'_{12}+z'_{21})] \\ &\quad+i_2(z'_{12}-nz'_{22}) \end{aligned} \qquad (12)$$

When $i_2$ is made equal to zero by open circuiting $h$–$g$, $$e_2=i_1(z'_{21}-nz'_{22}) \qquad (13)$$

and $$e_1=i_1[z'_{11}+n^2z'_{22}-n(z'_{12}+z'_{21})] \qquad (14)$$

When $i_1$ is made equal to zero by open circuiting $f$–$g$, $$e_2=i_2z'_{22} \qquad (15)$$

and $$e_1=i_2(z'_{12}-nz'_{22}) \qquad (16)$$

The following values for the circuit constants in Fig. 3A are then obtained:

$$Z_{11}=\frac{e_1}{i_1}=z'_{11}+n^2z'_{22}-n(z'_{12}+z'_{21}) \qquad (17)$$

$$Z_{21}=\frac{e_2}{i_1}=z'_{21}-nz'_{22} \qquad (18)$$

$$Z_{12}=\frac{e_1}{i_2}=z'_{12}=nz'_{22} \qquad (19)$$

$$Z_{22}=\frac{e_2}{i_2}=z'_{22} \qquad (20)$$

By choosing proper values of the turns ratio $n$, the transmission can be made zero for either direction of transmission through Figs. 3 and 3A.

When $$n=n_1=\frac{z'_{12}}{z'_{22}} \qquad (21)$$

$$Z_{12}=0 \qquad (22)$$

indicating an infinite loss from H to H, and $$Z_{21}=z'_{21}-z'_{12} \qquad (23)$$

When $$n=n_2=\frac{z'_{21}}{z'_{22}} \qquad (24)$$

and $$Z_{12}=-(z'_{21}-z'_{12}) \qquad (25)$$

and $$Z_{21}=0 \qquad (26)$$

indicating an infinite loss from F to H. The transfer impedance is the same in both instances in the operative direction, except for a difference in sign indicating a phase reversal.

The terminal impedances of Figs. 3 and 3A are the same for either value of $n$ and are $$Z_{11}=z'_{11}\left(1-\frac{z'_{12}z_{21}}{z'_{11}z_{22}}\right) \quad (27)$$

or $$Z_{11}=\frac{Q^2}{z'_{22}} \quad (28)$$

where $$Q^2=z'_{11}z'_{22}-z'_{12}z'_{21} \quad (29)$$

and $$Z_{22}=z'_{22} \quad (30)$$

It can readily be shown that $Z_{11}$ is the same as the impedance looking into terminals $f$–$g$ of Fig. 2 when terminals $h$–$g$ are short-circuited, while $Z_{22}$ is, of course, the impedance looking into terminals $h$–$g$ when terminals $f$–$g$ are open. Since either $Z_{12}$ or $Z_{21}$ may be zero, $Z_{11}$ and $Z_{22}$ represent the terminal impedances of the circuit which are independent of the external terminations at the opposite end of the network.

In accordance with a principal feature of the present invention, a transformer having the turns ratio specified by Equation 21 is associated with a transistor in the negative impedance converter of Figs. 1 and 1A to insure the maintenance of a negative impedance conversion ratio which is substantially a numeric over the operating frequency range. The first or primary winding is connected across the transistor output terminals or electrodes $h$ and $g$, while the second or secondary winding is connected in series with the transistor input electrode $f$. The transformer turns ratio is $1:n$ from the first winding to the second.

If Fig. 2 represents a transistor with the emitter electrode E corresponding to $f$, the base electrode B corresponding to $g$, and the collector electrode C corresponding to $h$, its constants become the usual transistor constants. That is, $z'_{11}=z_{11}$=open circuit impedance between E and B
$z'_{22}=z_{22}$=open circuit impedance between C and B
$z'_{21}=z_{21}$=transfer impedance, E–B to C–B
$z'_{12}=z_{12}$=transfer impedance, C–B to E–B In the above transistor notation, the subscript 1 refers to the path between E and B and the subscript 2 refers to the path between C and B. When the transistor is operated in other than the common base configuration, i. e., with either electrode E or electrode C common to the input and output circuit paths, the path between E and C becomes of interest. This path may be designated by the subscript 3, giving the following additional constants which can be shown to have the values given below:

$z_{33}=z_{11}+z_{22}-z_{12}-z_{21}$=open circuit impedance between E and C
$z_{13}=z_{11}-z_{12}$=transfer impedance C–E to B–E
$z_{31}=z_{11}-z_{21}$=transfer impedance B–E to C–E
$z_{32}=z_{22}-z_{12}$=transfer impedance B–C to E–C
$z_{23}=z_{22}-z_{21}$=transfer impedance E–C to B–C Of the above quantities, $z_{33}$, $z_{31}$, and $z_{23}$ are usually negative.

In accordance with a principal feature of the invention, the transistor may be connected to the circuit of Fig. 1 in any of the six different ways shown in Figs. 4A, 4B, 5A, 5B, 6A, and 6B. Each figure shows a transistor 21 having an emitter electrode E, collector electrode C, and a base electrode B. The input and output terminals of the resulting circuits are labeled F–G and G–H, respectively, to correspond with the designations used in Fig. 3. In all of these figures only A.-C. circuits are shown for the sake of clarity. If the circuits shown are to be utilized as one-way amplifiers, suitable D.-C. bias should be provided for the transistor electrodes in the manner well known in the art.

Figure 4A:
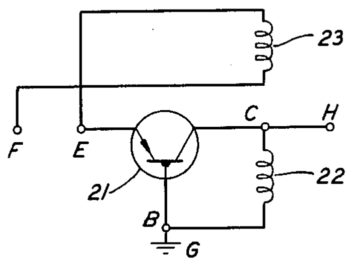
Figs. 4A and 4B show common-base transistor circuits in which reverse transmission is neutralized in accordance with a feature of the invention and the input impedance is reduced to a low value.
Figure 4B:
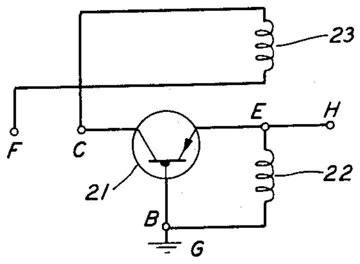

Figs. 4A and 4B show the neutralizing transformer connections featured by the present invention for transistor circuits of the so-called common base configuration. In Fig. 4A transmission is from E to C and the relationships between the transistor 4-pole impedances given in Fig. 2 are as follows:

$$z'_{11}=z_{11} \quad (31)$$
$$z'_{21}=z_{21} \quad (32)$$
$$z'_{12}=z_{12} \quad (33)$$
$$z'_{22}=z_{22} \quad (34)$$

From the above values and Equation 21, the transformer turns ratio in Fig. 4A featured in the invention is, from winding 22 to winding 23, $$n=z_{12}/z_{22} \quad (35)$$

while, from Equations 23 and 27, the transfer impedance in the direction of transmission is $$z_{21}=z_{21}-z_{12} \quad (36)$$

and the input impedance between terminals F and G is $$Z_{11}=Q^2/z_{22} \quad (37)$$

where $$Q^2=z_{11}z_{22}-z_{12}z_{21} \quad (38)$$

In Fig. 4B, transmission is from C to E and the relationships between the transistor impedances and the impedances of Fig. 2 are:

$$z'_{11}=z_{22} \quad (39)$$
$$z'_{21}=z_{12} \quad (40)$$
$$z'_{12}=z_{21} \quad (41)$$
$$z'_{22}=z_{11} \quad (42)$$

The transformer turns ratio in Fig. 4B featured by the invention is, from winding 22 to winding 23

$$n=z_{21}/z_{11} \quad (43)$$

the transfer impedance in the direction of transmission is $$Z_{21}=-(z_{21}-z_{12}) \quad (44)$$

and the input impedance between terminals F and G is $$Z_{11}=Q^2/z_{11} \quad (45)$$

where $Q^2$ is as given in Equation (38).

Figure 5A:
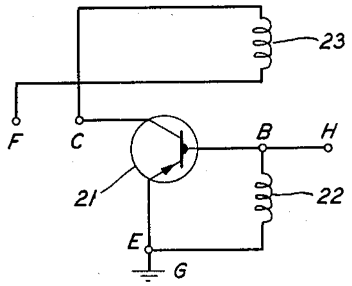
Figs. 5A and 5B and Figs. 6A and 6B show common-emitter transistor circuits and common-collector transistor circuits, respectively, in which reverse transmission is neutralized in accordance with a feature of the invention and input impedance is substantially reduced.
Figure 5B:
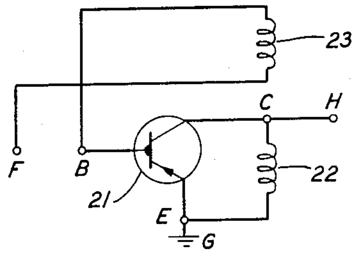

Figs. 5A and 5B generally correspond to Figs. 4A and 4B but show the neutralizing transformer connections featured by the invention for common emitter transistor circuits. In Fig. 5A, transmission is from C to B and the relationships between the transistor impedances and those of Fig. 2 are $$z'_{11}=z_{33}=z_{11}+z_{22}-z_{12}-z_{21} \quad (46)$$
$$z'_{21}=z_{13}=z_{11}-z_{12} \quad (47)$$
$$z'_{12}=z_{31}=z_{11}-z_{21} \quad (48)$$
$$z'_{22}=z_{11} \quad (49)$$

The transformer turns ratio in Fig. 5A is $$n=z_{31}/z_{11} \quad (50)$$

while the transfer impedance in the direction of transmission is $$Z_{21}=z_{13}-z_{31}=z_{21}-z_{12} \quad (51)$$

and the input impedance is $$Z_{11}=Q^2/z_{11} \quad (52)$$

In Fig. 5B, the transmitting direction is from B to C and the relationships between the specific transfer impedances and the generalized impedances of Fig. 2 are:

$$z'_{11}=z_{11} \quad (53)$$
$$z'_{21}=z_{31}=z_{11}-z_{21} \quad (54)$$
$$z'_{12}=z_{13}=z_{11}-z_{12} \quad (55)$$
$$z_{22}=z_{33}=z_{11}+z_{22}-z_{12}-z_{21} \quad (56)$$

In Fig. 5B, the transformer turns ratio is $$n = z_{13}/z_{33} \quad (57)$$

making the transfer impedance $$Z_{21} = -(z_{21} - z_{12}) \quad (58)$$

and the input impedance $$Z_{11} = Q^2/z_{33} \quad (59)$$

The quantity $Q^2$ is, of course, still that given by Equation 38.

Figure 6A:
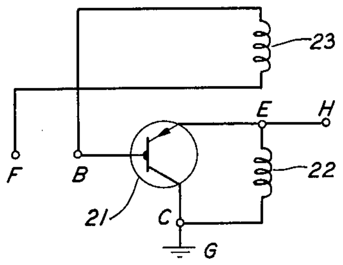
Figure 6B:
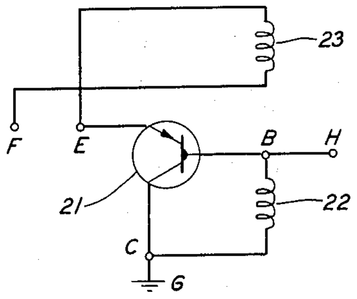

Figs. 6A and 6B also correspond to Figs. 4A and 4B but show the transformer connections for common collector transistor circuits. In the arrangement shown in Fig. 6A, the direction of transmission is from B to E and the relationships between actual and generalized impedances are:

$$z'_{11} = z_{22} \quad (60)$$
$$z'_{21} = z_{32} = z_{22} - z_{12} \quad (61)$$
$$z'_{12} = z_{23} = z_{22} - z_{21} \quad (62)$$
$$z'_{22} = z_{33} = z_{11} + z_{22} - z_{12} - z_{21} \quad (63)$$

The transformer turns ratio in Fig. 6A is, in accordance with the present invention, $$n = z_{23}/z_{33} \quad (64)$$

making the transfer impedance F–G to G–H $$Z_{21} = z_{21} - z_{12} \quad (65)$$

and the input impedance at F–G $$Z_{11} = Q^2/z_{33} \quad (66)$$

In Fig. 6B, transmission is from E to B and the impedance relationships are:

$$z'_{11} = z_{33} = z_{11} + z_{22} - z_{12} - z_{21} \quad (67)$$
$$z'_{21} = z_{23} = z_{22} - z_{21} \quad (68)$$
$$z'_{12} = z_{32} = z_{22} - z_{12} \quad (69)$$
$$z'_{22} = z_{22} \quad (70)$$

The transformer turns ratio from winding 22 to winding 23 in Fig. 6B is $$n = z_{32}/z_{22} \quad (71)$$

and, as a result, $$Z_{21} = -(z_{21} - z_{12}) \quad (72)$$

and $$Z_{11} = Q^2/z_{22} \quad (73)$$

In the above examples, it will be observed, the transfer impedance in the transmitting direction has the same magnitude regardless of the transistor circuit configuration used. That is because $$z_{13} - z_{31} = z_{32} - z_{23} = z_{21} - z_{12} \quad (74)$$

This quantity is equal to the so-called mutual resistance $r_m$ of the equivalent T network often used to depict a transistor. It will also be observed that $Q^2$ has the same value in all cases since $$z_{11}z_{22} - z_{12}z_{21} = z_{11}z_{33} - z_{13}z_{31} = z_{22}z_{33} - z_{23}z_{32} = Q^2 \quad (75)$$

For most transistors, $Q^2$ is already a very small quantity, making the input impedance $Z_{11}$ small enough to be considered negligible with respect to the energy absorbed between terminals F and G. Depending somewhat upon the internal impedances of the particular transistor, that input impedance can be reduced still further to substantially zero by the addition of suitable resistances in series with one or more of the transistor electrodes in the manner previously described. Q is then made substantially zero.

Since the turns ratio of the neutralizing transformer featured by the present invention is related to the equivalent transistor 4-pole impedances and since these impedances differ considerably among different units of some types of transistors, the invention also features adjustable resistors in series with one or more of the transistor electrodes to build out the constants of a particular transistor to the proper ratio to correspond to a chosen transformer turns ratio. For example, in the case of the arrangement shown in Fig. 4A, a variable resistance in series with the transistor base electrode B could adjust $z_{12}$ to the desired ratio to $z_{22}$.

One specific embodiment of the invention in the form of a transformer negative impedance converter is shown in Fig. 7. The converter shown is substantially the same as the generalized diagram given in Fig. 1 except that the inherent reverse transmission through the transistor 21 is neutralized in the manner which has just been described and the transistor input impedance is reduced to substantially zero. In Fig. 1 the transistor 21 is connected in the so-called common base configuration (i. e., with the base electrode common to the transistor input and output circuits). The transistor base electrode is grounded through a first small variable resistor 24 and a second small variable resistor 25 is connected in series with the transistor emitter electrode. An operating forward D.-C. emitter bias is provided by a large resistor 26 and a D.-C. source 26 connected in series between resistor 25 and ground, while the required reverse collector bias is provided by a second D.-C. source 28 connected in series with primary transformer winding 22 between the transistor collector electrode and ground. A bypass capacitor 29 is connected in parallel with source 28.

In the embodiment of the invention shown in Fig. 7, transmission through transistor 21 is in the direction from emitter to collector and, since a common base circuit configuration is used, transformer 22—23 is given a turns ratio of substantially $1:z_{12}/z_{22}$ from winding 22 to winding 23, as specified by Equation 35. Resistors 24 and 25 are adjusted to reduce the low input impedance provided by transformer 22—23 to substantially zero, thus permitting the requirements of both unidirectional transmission and zero energy absorption to be fulfilled.

The primary winding 30 of a second transformer (the transformer with the turns ratio $k$ discussed earlier in connection with Figs. 1) is connected in series with winding 23 between the emitter electrode (actually the side of resistor 25 remote from the emitter electrode) of transistor 21 and ground. The secondary winding 31 of the second transformer is connected in series with a variable resistance 32 (the resistance $R_N$ described in connection with Fig. 1) between the collector electrode of transistor 21 and ground, and a D. C. blocking capacitor 33 is connected in the same series path between resistor 32 and winding 31. A passive terminating impedance network 34 (network N in Fig. 1) is connected in parallel with resistor 32 and provides the impedance which is to be converted into a negative impedance, and a pair of external utilization terminals 35 are connected respectively to the collector electrode of transistor 21 and ground.

The embodiment of the invention shown in Fig. 7 operates in the manner described in connection with Fig. 1. The product $k\alpha$ is made greater than unity, giving a negative conversion ratio. With the relative arrangement of terminating network 34 and terminals 35 shown in Fig. 7, the impedance presented at terminals 35 is, as previously stated $$Z = \frac{N}{-(k\alpha - 1)} \quad (4)$$

while with network 34 connected between the collector electrode and ground and terminals 35 connected to opposite ends of resistor 32, the impedance presented at terminals 35 is $$Z = -N(k\alpha - 1) \quad (5)$$

An alternative embodiment of the invention giving a slightly different negative impedance conversion factor is illustrated in Fig. 8. As shown, the circuit is the same as that of Fig. 7 except for the second transformer. In Fig. 8, transformer 30—31 is replaced by a three-winding transformer 36—37—38. The three windings are connected in series in the order named between blocking capacitor 33 and the one of output terminals 35 which, in Fig. 7, is connected to ground. The junction between windings 37 and 38 is grounded in Fig. 8, while the junction between windings 36 and 37 is connected to secondary winding 23 of the transistor neutralizing transformer.

Transformer 36—37—38 has a turns ratio of $1:k$ from winding 37 to the series combination of windings 36 and 37 and the same turns ratio of $1:k$ from winding 38 to the series combination of windings 36 and 37. Winding 37 may, therefore, be termed the primary winding and the series combination of windings 36 and 37 the secondary winding of transformer 36—37—38.

Without winding 38, the negative impedance converter shown in Fig. 8 would have the same negative impedance conversion factor as the one shown in Fig. 7. The presence of this additional winding, however, changes this factor somewhat. The impedance presented at terminals 35 in Fig. 8, it can readily be shown, is $$Z=-N\left(\frac{\alpha+1}{k\alpha-1}\right) \qquad (76)$$

while the impedance presented at the same terminals if their position is interchanged with that of terminating network 34 is $$Z=-N\left(\frac{k\alpha-1}{\alpha+1}\right) \qquad (77)$$

Fig. 9 shows an embodiment of the invention corresponding to Fig. 1A which is particularly suitable for use with transistors having values of $\alpha$ greater than unity. It is the same as that shown in Fig. 7 except that transformer 30—31 is not needed to couple resistor 32 and network 34 between the emitter and collector electrodes of transistor 21. Variable resistor 32 (corresponding to resistance $R_N$ in Fig. 1A), blocking capacitor 33, and secondary winding 23 of neutralizing transformer 22, 23 are connected in series from the junction between resistors 25 and 26 to the collector electrode of transistor 21. As explained in connection with Fig. 1A, the converter produces an impedance of $$Z=\frac{N}{-(\alpha-1)} \qquad (9)$$

when the relative positions of network 34 and terminals 35 are as shown and $$Z=-N(\alpha-1) \qquad (10)$$

when they are reversed.

While the negative impedance converters of Figs. 7, 8, and 9 are shown utilizing transistors connected in the common base configuration and having forward directions of transmission from emitter to collector, they are intended to typify other circuit arrangements utilizing the neutralized transistor configurations shown in Figs. 4B, 5A, 5B, 6A and 6B. These other neutralized transistor arrangements may, in accordance with the present invention, be connected into the illustrated negative impedance converter circuits in the same manner as the arrangement of Fig. 4A.

Figs. 10 and 11 show how the transistor negative impedance converters of Figs. 8 and 9, respectively, can be used in shunt across a transmission line 40 and how biasing currents can be transmitted to them over the line. In both Figs. 10 and 11, one end of the line 40 is shown associated with a coupling transformer having a primary winding 41 and a pair of secondary windings 42 and 43. Windings 42 and 43 are connected in series directly across the end of line 40 and a D. C. biasing source 44 is connected between them. A bypass condenser 45 is connected in parallel with source 44 and source 44 is poled to bias the collector electrode of the converter transistor 21 in the reverse direction in each instance.

In Fig. 10 the negative impedance converter is provided with a self biasing circuit for the transistor emitter electrode in the form of a small resistor 46 and bypass capacitor 47 connected in parallel between the transistor base electrode and transformer winding 22. In Fig. 11 the arrangement is the same except that, in addition, a larger unbpyassed resistor 48 is connected between the emitter electrode of transistor 21 and neutralizing transformer winding 22.

It is to be understood that the above described arrangements are illustrative of the application of the principles of the invention. Numerous other arrangements may be devised by those skilled in the art without departing from the spirit and scope of the invention.

What is claimed is:

1. A negative impedance converter which comprises a transistor having an emitter electrode, a collector electrode, and a base electrode, a first transformer having a first winding, a second winding, and a turns ratio from said first winding to said second winding of substantially $$1:\frac{z'_{12}}{z'_{22}}$$

where $z'_{12}$ is the transfer impedance from a first pair of said transistor electrodes to a second pair of said transistor electrodes and $z'_{22}$ is the self-impedance between said first pair of transistor electrodes, a first impedance having a value of substantially $z'_{22}(k\alpha-1)$, where $k$ is a real number and $\alpha$ is the current amplification factor of said transistor, said first winding being connected between said first pair of transistor electrodes and said second winding being connected in series with said first impedance between a pair of said transistor electrodes, a first pair of terminals coupled to said first pair of transistor electrodes and a second pair of terminals coupled to opposite ends of said first impedance, whereby an impedance N connected across said first pair of terminals causes an impedance of substantially $-a$N to be presented at said second pair of terminals and an impedance N connected across said second pair of terminals causes an impedance of substantially $$\frac{N}{-a}$$

to be presented at said first pair of terminals, where $a$ is substantially a real number over a predetermined operating frequency range.

2. A negative impedance converter which comprises a transistor having an emitter electrode, a collector electrode, and a base electrode, a first transformer having a first winding, a second winding, and a turns ratio from said first winding to said second winding of substantially $$1:\frac{z_{12}}{z_{22}}$$

where $z_{12}$ is the transfer impedance from said collector and base electrodes to said emitter and base electrodes and $z_{22}$ is the self-impedance between said collector and base electrodes, a first impedance having a value of substantially $z_{22}(k\alpha-1)$, where $k$ is a real number and $\alpha$ is the current amplification factor of said transistor, said first winding being connected between said collector and base electrodes and said second winding being connected in series with said first impedance between said collector electrode and one of the other of said transistor electrodes, a first pair of terminals coupled to said collector and base electrodes and a second pair of terminals coupled to opposite ends of said first impedance, whereby an impedance N connected across said first pair of terminals causes an impedance of substantially $-a$N to be presented at said second pair of terminals and an impedance N connected across said second pair of terminals causes an impedance of substantially $$\frac{N}{-a}$$

to be presented at said first pair of terminals, where $a$ is substantially a real number over a predetermined operating frequency range.

3. A negative impedance converter which comprises a transistor having an emitter electrode, a collector electrode, and a base electrode, a first transformer having a first winding, a second winding, and a turns ratio from said first winding to said second winding of substantially $$1:\frac{z'_{12}}{z'_{22}}$$

where $z'_{12}$ is the transfer impedance from a first pair of said transistor electrodes to a second pair of said transistor electrodes and $z'_{22}$ is the self-impedance between said first pair of transistor electrodes, a second transformer having a third winding, a fourth winding, and a turns ratio from said third winding to said fourth winding of substantially $1:k$, a first impedance having a value of substantially $z'_{22}(k\alpha-1)$, where $\alpha$ is the current amplification factor of said transistor, said first winding being connected between said first pair of transistor electrodes, said second and third windings being connected in series between said second pair of transistor electrodes, and said fourth winding being connected in series with said first impedance between said first pair of transistor electrodes, a first pair of terminals coupled to said first pair of transistor electrodes and a second pair of terminals coupled to opposite ends of said first impedance, whereby an impedance N connected across said first pair of terminals causes an impedance of substantially $-a$N to be presented at said second pair of terminals and an impedance N connected across said second pair of terminals causes an impedance of substantially $$\frac{N}{-a}$$

to be presented at said first pair of terminals, where $a$ is substantially a real number over a predetermined operating frequency range.

4. A negative impedance converter which comprises a transistor having an emitter electrode, a collector electrode, and a base electrode, a first transformer having a first winding, a second winding, and a turns ratio from said first winding to said second winding of substantially $$1:\frac{z_{12}}{z_{22}}$$

where $z_{12}$ is the transfer impedance from said collector and base electrodes to said emitter and base electrodes and $z_{22}$ is the self-impedance between said collector and base electrodes, a second transformer having a third winding, a fourth winding, and a turns ratio from said third winding to said fourth winding of substantially $1:k$, a first impedance having a value of substantially $z_{22}(k\alpha-1)$, where $\alpha$ is the current amplification factor of said transistor, said first winding being connected between said collector and base electrodes, said second and third windings being connected in series between said emitter and base electrodes, and said fourth winding being connected in series with said first impedance between said collector and base electrodes, a first pair of terminals coupled to said collector and base electrodes and a second pair of terminals coupled to opposite ends of said first impedance, whereby an impedance N connected across said first pair of terminals causes an impedance of substantially $-a$N to be presented at said second pair of terminals and an impedance N connected across said second pair of terminals causes an impedance of substantially $$\frac{N}{-a}$$

to be presented at said first pair of terminals, where $a$ is substantially a real number over a predetermined operating frequency range.

5. A negative impedance converter which comprises a transistor having an emitter electrode, a collector electrode, and a base electrode, a first transformer having a first winding, a second winding, and a turns ratio from said first winding to said second winding of substantially $$1:\frac{z'_{12}}{z'_{22}}$$

where $z'_{12}$ is the transfer impedance from a first pair of said transistor electrodes to a second pair of said transistor electrodes and $z'_{22}$ is the self-impedance between said first pair of transistor electrodes, a first impedance having a value of substantially $z'_{22}(\alpha-1)$, where $\alpha$ is the current amplification factor of said transistor, said first winding being connected between said first pair of transistor electrodes and said second winding being connected in series with said first impedance between a third pair of said transistor electrodes, a first pair of terminals coupled to said second pair of transistor electrodes and a second pair of terminals coupled to opposite ends of said first impedance, whereby an impedance N connected across said first pair of terminals causes an impedance of substantially $-a$N to be presented at said second pair of terminals and an impedance N connected across said second pair of terminals causes an impedance of substantially $$\frac{N}{-a}$$

to be presented at said first pair of terminals, where $a$ is substantially a real number over a predetermined operating frequency range.

6. A negative impedance converter which comprises a transistor having an emitter electrode, a collector electrode, and a base electrode, a first transformer having a first winding, a second winding, and a turns ratio from said first winding to said second winding of substantially $$1:\frac{z_{12}}{z_{22}}$$

where $z_{12}$ is the transfer impedance from said collector and base electrodes to said emitter and base electrodes, and $z_{22}$ is the self-impedance between said collector and base electrodes, a first impedance having a value of substantially $z_{22}(\alpha-1)$, where $\alpha$ is the current amplification factor of said transistor, said first winding being connected between said collector and base electrodes and said second winding being connected in series with said first impedance between said emitter and collector electrodes, a first pair of terminals coupled to said collector and base electrodes and a second pair of terminals coupled to opposite ends of said first impedance, whereby an impedance N connected across said first pair of terminals causes an impedance of substantially $-a$N to be presented at said second pair of terminals and an impedance N connected across said second pair of terminals causes an impedance of substantially $$\frac{N}{-a}$$

to be presented at said first pair of terminals, where $a$ is substantially a real number over a predetermined operating frequency range.

7. A negative impedance converter which comprises a transistor having an emitter electrode, a collector electrode, and a base electrode, one pair of said electrodes forming a pair of input electrodes and another pair of said electrodes forming a pair of output electrodes for said transistor, a first transformer having a first winding, a second winding, and a turns ratio from said first winding to said second winding of substantially $$1:\frac{z'_{12}}{z'_{22}}$$

where $z'_{12}$ is the transfer impedance from said output electrodes to said input electrodes and $z'_{22}$ is the self-impedance between said output electrodes, a first impedance having a value of substantially $z'_{22}(k\alpha-1)$, where $k$ is a real number and $\alpha$ is the current amplification factor of said transistor, said first winding being connected between said output electrodes, said second winding being coupled in series with said first impedance between a third pair of said transistor electrodes, and said first and second windings being poled with respect to each other to provide degenerative feedback from said output electrodes to said input electrodes, a first pair of terminals coupled to said output electrodes and a second pair of terminals coupled to opposite ends of said first impedance, whereby an impedance N connected across said first pair of terminals causes an impedance of substantially $-a$N to be presented at said second pair of terminals and an impedance N connected across said second pair of terminals causes an impedance of substantially $$\frac{N}{-a}$$

to be presented at said first pair of terminals, whereby $a$ is substantially a real number over a predetermined operating frequency range.

8. A negative impedance converter which comprises a transistor having an emitter electrode, a collector electrode, and a base electrode, a first transformer having a first winding, a second winding, and a turns ratio from said first winding to said second winding of substantially $$1:\frac{z_{12}}{z_{22}}$$

where $z_{12}$ is the transfer impedance from said collector and base electrodes to said emitter and base electrodes and $z_{22}$ is the self-impedance between said collector and base electrodes, a first impedance having a value of substantially $z_{22}(k\alpha-1)$, where $k$ is a real number and $\alpha$ is the current amplification factor of said transistor, said first winding being connected between said collector and base electrodes, said second winding being coupled in series with said first impedance between said emitter and collector electrodes, and said first and second windings being poled with respect to each other to provide degenerative feedback from said collector electrode to said emitter electrode, a first pair of terminals coupled to said collector and base electrodes, and a second pair of terminals coupled to opposite ends of said first impedance, whereby an impedance N connected across said first pair of terminals causes an impedance of substantially $-a$N to be presented at said second pair of terminals and an impedance N connected across said second pair of terminals causes an impedance of substantially $$\frac{N}{-a}$$

to be presented at said first pair of terminals, where $a$ is substantialy a real number over a predetermined operating frequency range.

9. A negative impedance converter which comprises a transistor having an emitter electrode, a collector electrode, and a base electrode, one pair of said electrodes forming a pair of input electrodes and another pair of said electrodes forming a pair of output electrodes for said transistor, a first transformer having a first winding, a second winding, and a turns ratio from said first winding to said second winding of substantially $$1:\frac{z'_{12}}{z'_{22}}$$

where $z'_{12}$ is the transfer impedance from said output electrodes to said input electrodes and $z'_{22}$ is the self-impedance between said output electrodes, a second transformer having a third winding, a fourth winding, and a turns ratio from said third winding to said fourth winding of $1:k$, a first impedance having a value of substantially $z'_{22}$ $(k\alpha-1)$, where $\alpha$ is the current amplification factor of said transistor, said first winding being connected between said output electrodes, said second winding being connected in series with said third winding between said input electrodes, said fourth winding being connected in series with said first impedance between said output electrodes, said first and second windings being poled with respect to each other to provide degenerative feedback from said output electrodes to said input electrodes, and said third and fourth windings being poled with respect to each other to provide regenerative feedback from said output electrodes to said input electrodes, a first pair of terminals coupled to said output electrodes and a second pair of terminals coupled to opposite ends of said first impedance, whereby an impedance N connected across said first pair of terminals causes an impedance of substantially $-(k\alpha-1)N$ to be presented at said second pair of terminals and an impedance N connected across said second pair of terminals causes an impedance of substantially $$\frac{N}{-(k\alpha-1)}$$

to be presented at said first pair of terminals.

10. A negative impedance converter which comprises a transistor having an emitter electrode, a collector electrode, and a base electrode, a first transformer having a first winding, a second winding, and a turns ratio from said first winding to said second winding of substantially $$1:\frac{z_{12}}{z_{22}}$$

where $z_{12}$ is the transfer impedance from said collector and base electrodes to said emitter and base electrodes and $z_{22}$ is the self-impedance between said collector and base electrodes, a second transformer having a third winding, a fourth winding, and a turns ratio from said third winding to said fourth winding of $1:k$, a first impedance having a value of substantially $z_{22}(k\alpha-1)$, where $\alpha$ is the current amplification factor of said transitor, said first winding being connected between said collector and base electrodes, said second winding being connected in series with said third winding between said emitter and base electrodes, said fourth winding being connected in series with said first impedance between said collector and base electrodes, said first and second windings being poled with respect to each other to provide degenerative feedback from said collector electrode to said emitter electrode and said third and fourth windings being poled with respect to each other to provide regenerative feedback from said collector electrode to said emitter electrode, a first pair of terminals coupled to said collector and base electrodes and a second pair of terminals coupled to opposite ends of said first impedance, whereby an impedance N connected across said first pair of terminals causes an impedance of substantially $-(k\alpha-1)N$ to be presented at said second pair of terminals and an impedance N connected across said second pair of terminals causes an impedance of substantially $$\frac{N}{-(k\alpha-1)}$$

to be presented at said first pair of terminals.

11. A negative impedance converter which comprises a transistor having an emitter electrode, a collector electrode, and a base electrode, one pair of said electrodes forming a pair of input electrodes and another pair of said electrodes forming a pair of output electrodes for said transistor, a first transformer having a first winding, a second winding, and a turns ratio from said first winding to said second winding of substantially $$1:\frac{z'_{12}}{z'_{22}}$$

where $z'_{12}$ is the transfer impedance from said output electrodes to said input electrodes and $z'_{22}$ is the self-impedance between said output electrodes, a second transformer having a third winding, a fourth winding, a fifth winding, a turns ratio from said third winding to said fourth winding of $1:k$, and a turns ratio from said fifth winding to said fourth winding of $1:k$, a first impedance having a value of substantially $z'_{22}(k\alpha-1)$, where $\alpha$ is the current amplification factor of said transistor, said first winding being connected between said output electrodes, said second winding being connected in series with said third winding between said input electrodes, said fourth winding being connected in series with said first impedance between said output electrodes, said fifth winding having one end connected to the one of said transistor electrodes common to said input and output pairs of electrodes, said first and second windings being poled with respect to each other to provide degenerative feedback from said output electrodes to said input electrodes, and said third, fourth, and fifth windings being poled with respect to each other to provide regenerative feedback from said output electrodes to said input electrodes, a first pair of terminals coupled one to the one of said output electrodes not common to said input electrodes and the other to the other end of said fifth winding and a second pair of terminals coupled to opposite ends of said first impedance, whereby an impedance N connected across said first pair of terminals causes an impedance of substantially $$-\left(\frac{k\alpha-1}{\alpha+1}\right)N$$

to be presented at said second pair of terminals and an impedance N connected across said second pair of terminals causes an impedance of substantially $$-\left(\frac{\alpha+1}{k\alpha-1}\right)N$$

to be presented at said first pair of terminals.

12. A negative impedance converter which comprises a transistor having an emitter electrode, a collector electrode, and a base electrode, a first transformer having a first winding, a second winding, and a turn ratio from said first winding to said second winding of substantially $$1:\frac{z_{12}}{z_{22}}$$

where $z_{12}$ is the transfer impedance from said collector and base electrodes to said emitter and base electrodes and $z_{22}$ is the self-impedance between said collector and base electrodes, a second transformer having a third winding, a fourth winding, a fifth winding, a turn ratio from said third winding to said fourth winding of $1:k$, and a turns ratio from said fifth winding to said fourth winding of $1:k$, a first impedance having a value of substantially $z_{22}(k\alpha-1)$, where $\alpha$ is the current amplification factor of said transistor, said first winding being connected between said collector and base electrodes, said second winding being connected in series with said third winding between said emitter and base electrodes, said fourth winding being connected in series with said first impedance between said collector and base electrodes, said fifth winding having one end connected to said base electrode, said first and second windings being poled with respect to each other to provide degenerative feedback from said collector electrode to said emitter electrode, and said third, fourth and fifth windings being poled with respect to each other to provide regenerative feedback from said collector electrode to said emitter electrode, a first pair of terminals coupled one to said collector electrode and the other to the other end of said fifth winding and a second pair of terminals coupled to opposite ends of said first impedance, whereby an impedance N connected across said first pair of terminals causes an impedance of substantially $$-\left(\frac{k\alpha-1}{\alpha+1}\right)N$$

to be presented at said second pair of terminals and an impedance N connected across said second pair of terminals causes an impedance of substantially $$-\left(\frac{\alpha+1}{k\alpha-1}\right)N$$

to be presented at said first pair of terminals.

13. A negative impedance converter which comprises a transistor having an emitter electrode, a collector electrode, and a base electrode, one pair of said electrodes forming a pair of input electrodes and another pair of said electrodes forming a pair of output electrodes for said transistor, a first transformer having a first winding, a second winding, and a turns ratio from said first winding to said second winding of substantially $$1:\frac{z'_{12}}{z'_{22}}$$

where $z_{12}$ is the transfer impedance from said input electrodes to said output electrodes and $z'_{22}$ is the self-impedance between said output electrodes, a first impedance having a value of substantially $z'_{22}(\alpha-1)$, where $\alpha$ is the current amplification factor of said transistor, said first winding being connected between said output electrodes, said second winding being connected in series with said first impedance between a third pair of said transistor electrodes, and said first and second windings being poled with respect to each other to provide degenerative feedback from said output electrodes to said input electrodes, a first pair of terminals coupled to said output electrodes and a second pair of terminals coupled to opposite ends of said first impedance, whereby an impedance N connected across said first pair of terminals causes an impedance of substantially $-(\alpha-1)N$ to be presented at said second pair of terminals and an impedance N connected across said second pair of terminals causes an impedance of substantially $$\frac{N}{-(\alpha-1)}$$

to be presented at said first pair of terminals.

14. A negative impedance converter which comprises a transistor having an emitter electrode, a collector electrode, and a base electrode, a first transformer having a first winding, a second winding, and a turns ratio from said first winding to said second winding of substantially $$1:\frac{z_{12}}{z_{22}}$$

where $z_{12}$ is the transfer impedance from said emitter and base electrodes to said collector and base electrodes and $z_{22}$ is the self-impedance between said collector and base electrodes, a first impedance having a value of substantially $z_{22}(\alpha-1)$, where $\alpha$ is the current amplification factor of said transistor, said first winding being connected between said collector and base electrodes, said second winding being connected in series with said first impedance between said emitter and collector electrodes, and said first and second windings being poled with respect to each other to provide degenerative feedback from said collector electrode to said emitter electrode, a first pair of terminals coupled to said collector and base electrodes and a second pair of terminals coupled to opposite ends of said first impedance, whereby an impedance N connected across said first pair of terminals causes an impedance of substantially $-(\alpha-1)N$ to be presented at said second pair of terminals and an impedance N connected across said second pair of terminals causes an impedance of substantially $$\frac{N}{-(\alpha-1)}$$

to be presented at said first pair of terminals.

No references cited.